United States Patent
Eshet et al.

(10) Patent No.: US 7,831,729 B1
(45) Date of Patent: Nov. 9, 2010

(54) DEVICE AND METHOD FOR MANAGING MULTIPLE VERSIONS OF A SINGLE PROGRAM TRANSPORT STREAM

(75) Inventors: Amit Eshet, Kiryat Tivon (IL); Amit Hildesheim, Redwood City, CA (US)

(73) Assignee: Bigband Networks Inc., Redwood City, CA (US)

(*) Notice: Subject to any disclaimer, the term of this patent is extended or adjusted under 35 U.S.C. 154(b) by 139 days.

(21) Appl. No.: 12/037,103

(22) Filed: Feb. 26, 2008

Related U.S. Application Data

(60) Provisional application No. 60/944,103, filed on Jun. 15, 2007.

(51) Int. Cl.
*G06F 15/16* (2006.01)
*G06F 15/173* (2006.01)
*H04J 3/16* (2006.01)
*H04J 3/06* (2006.01)
*H04J 3/00* (2006.01)
*H04N 7/20* (2006.01)

(52) U.S. Cl. .............. 709/231; 709/236; 709/238; 370/465; 370/466; 370/503; 370/521; 725/67; 725/68; 725/70; 725/71

(58) Field of Classification Search .......... 709/231, 709/236, 238; 370/465, 466, 503, 521; 725/67, 725/68, 70, 71
See application file for complete search history.

(56) References Cited

U.S. PATENT DOCUMENTS

| 2004/0073929 A1* | 4/2004 | Morello ............ 725/63 |
| 2007/0121678 A1* | 5/2007 | Brooks et al. .......... 370/505 |

* cited by examiner

*Primary Examiner*—Wing F Chan
*Assistant Examiner*—David X Yi
(74) *Attorney, Agent, or Firm*—Reches Patents

(57) ABSTRACT

A method, system and computer program product. The method includes: receiving multiple variable bit rate version of a program; wherein different variable bit rate versions of the program differ from each other by their bit rate; converting each variable bit version of the program to a constant bit version of the program by adding null packets so that once an edge device removes the null packets a valid single program transport stream is generated; and transmitting multiple constant bit versions of the program to a server.

27 Claims, 5 Drawing Sheets

DEVICE AND METHOD FOR MANAGING MULTIPLE VERSIONS OF A SINGLE PROGRAM TRANSPORT STREAM

RELATED APPLICATIONS

This application claims priority from U.S. provisional patent Ser. No. 60/944,103 filing date Jun. 15, 2007.

FIELD OF THE INVENTION

The present invention relates to communication methods in general and to methods for managing multiple versions of a single program transport stream

BACKGROUND OF THE INVENTION

MPEG

Methods and systems for compressing and transmitting media signals are known in the art. Compressed digital video is largely becoming the preferred medium to transmit video to viewers everywhere. Part of the Moving Pictures Experts Group (MPEG) specifications are standardized methods for compressing and transmitting video. Various audio compression techniques, including MPEG compliant techniques, are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures; each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as a program stream or a transport stream. A transport stream combines one or more programs with one or more independent time bases into a single stream. A transport stream that includes a single program is referred to as a single program transport stream (SPTS) while a transport stream that combines multiple programs is referred to as a multiple program transport stream (MPTS).

Transport Streams include transport packets of 188 bytes. Transport Stream packets start with a transport packet header. The header includes a packet identifier (PID). Transport Stream packets of one PID value carry data of a single elementary stream. Transport Streams include Program Specific Information (PSI) tables. The PSI tables specify which PIDs and accordingly which elementary streams are associated to form each program.

The PSI tables are embedded within transport stream packets that have unique PID values that distinguish them from the elementary stream conveying transport stream packets.

Each program includes timing information that allows a reconstruction of the programs time base. The timing information is known as program clock reference (PCR). Not each transport packet includes a program clock reference. According to various standards program clock references should be transmitted at least once per 100 milliseconds or at least once per 40 milliseconds.

Multiple Version Systems

One of main problems that broadband operators face is that of the need to reduce the bit rate of streams in real-time. This is true for Cable, Telco and other operators. With the declining prices of storage and transport devices, more and more attention is given to a multi-rate solution and to variable bit rate (VBR) streams. In this case, several versions of a program or a stream are transmitted to an edge device. These different versions differ by their bit rate—each version is encoded at a different bit rate. These different version can ideally enable an edge device (which monitors the bandwidth available for the program/stream) to decide which of the versions should actually be transmitted by the device at any given time.

Many systems include a server that is connected to an edge device. It would be desirable to store multiple versions at the server and then send these multiple versions to an edge device. Nevertheless, this option is not supported by various servers and edge devices for at least some of the following reasons: (i) most servers support streaming of only constant bit rate streams and are not capable of supporting the streaming of variable bit rate streams to the edge device; (ii) most servers can not easily synchronize transmission of different streams such as different versions of the same program; (iii) some edge devices are adapted to transmit only constant bit rate versions; (iv) the switching between different versions of the same program should be performed in a seamless manner that is not possible if these different versions are not provided to the edge devices in a synchronized manner.

There is growing need to provide an efficient method, system and a computer program product for managing different versions of the same program.

SUMMARY OF THE INVENTION

A method for providing multiple versions of a program, the method includes: receiving multiple variable bit rate version of a program; wherein different variable bit rate versions of the program differ from each other by their bit rate; converting each variable bit version of the program to a constant bit version of the program by adding null packets so that once an edge device removes the null packets a valid single program transport stream is generated; and transmitting multiple constant bit versions of the program to a server.

A computer program product comprising a computer usable medium including a computer readable program, wherein the computer readable program when executed on a computer causes the computer to: receive multiple variable bit rate version of a program; wherein different variable bit rate versions of the program differ from each other by their bit rate; convert each variable bit version of the program to a constant bit version of the program by adding null packets so that once an edge device removes the null packets a valid single program transport stream is generated; and transmit multiple constant bit versions of the program to a server.

A method for outputting a program, the method includes: receiving, by an edge device, multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated; selecting, at each point in time out of multiple points in time, a selected version of the program; and transmitting a portion of the selected version of the program in response to the selection.

A computer program product comprising a computer usable medium including a computer readable program, wherein the computer readable program when executed on a computer of an edge device causes the computer to: receive multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated; select, at each point in time out of multiple points in time, a selected constant bit rate portion of a constant bit rate version of the program while ignoring constant bit rate portions of other constant bit rate versions of the program; and transmit a portion of a version of the program in response to the selection.

A system that includes: a memory unit adapted to store multiple variable bit rate version of a program; wherein different variable bit rate versions of the program differ from each other by their bit rate; a converter, adapted to convert each variable bit version of the program to a constant bit version of the program by adding null packets so that once an edge device removes the null packets a valid single program transport stream is generated; and a transmitter adapted to transmit multiple constant bit versions of the program to a server that is coupled to an edge device.

An edge device that includes: a memory unit adapted to store portions of multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated; a selection unit adapted to select, at each point in time out of multiple points in time, a selected constant bit rate portion of a constant bit rate version of the program while ignoring constant bit rate portions of other constant bit rate versions of the program; and a transmitter adapted to transmit a portion

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE DRAWINGS

Figure 1:
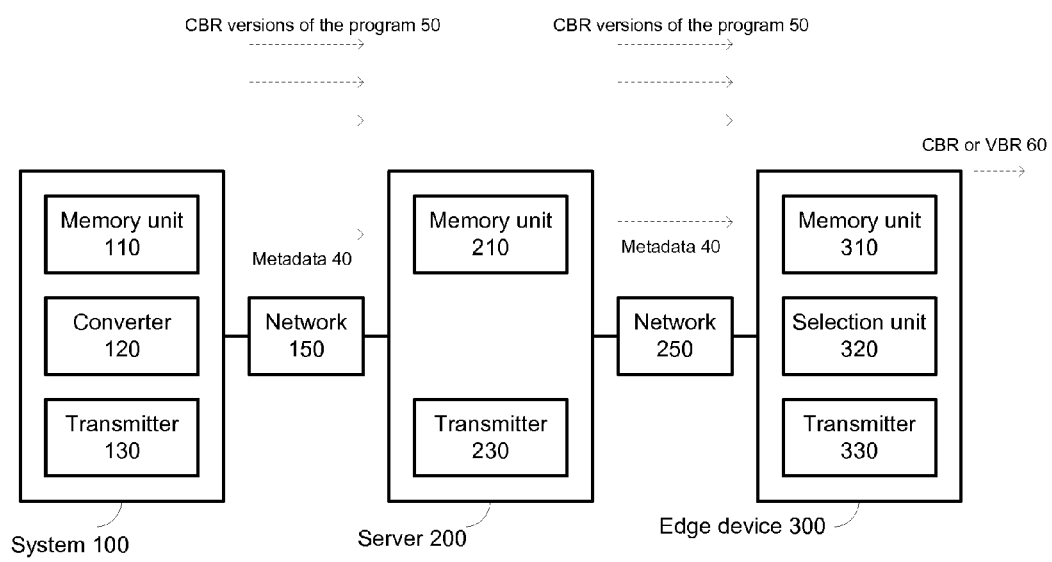
FIG. 1 illustrates a system, a server, and an edge device according to an embodiment of the invention.

The following figures illustrate exemplary embodiments of the invention. They are not intended to limit the scope of the invention but rather assist in understanding some of the embodiments of the invention. It is further noted that all the figures are out of scale.

For simplicity of explanation the following description refers to MPEG-2 compliant stream. Those skilled in the art will appreciate that the methods and computer program products can be applied mutatis mutandis to other media formats.

According to an embodiment of the invention multiple versions of the same program are processed before being provided to the server. The processing simplifies the provision of multiple versions of the program to the server, simplifies the provision of the multiple versions of the program to the edge device and also simplifies the transmission of selected portions of various versions of the program by the edge device.

This processing provides versions of the program that can be easily managed by servers of different types and by edge devices of different types. For example, servers that can not manage the streaming of variable bit rate programs can easily transmit to the edge device a constant bit rate version of a program. Yet for another examples, an edge device that can transmit variable bit rate version of the program can transmit such a version while another edge device that is not capable of transmitting variable bit rate version will transmit a constant bit rate version of the program. In both cases the server will transmit a processed constant bit rate version of the program.

Conveniently, the processing includes converting variable bit rate versions of a program to constant bit rate versions of the program by padding them with null packets in such a way that if the null packets are discarded, the remaining stream is still a legal MPEG single program transport stream.

Conveniently, the different constant bit rate versions of a program can be multiplexed together into one stream. They can certainly be multiplexed together as a Multiple Program Transport Stream (MPTS), but this requires a re-mapping of the packet identifiers (PIDs) so as to differentiate between different constant bit rate versions of the same program.

Conveniently, the remapping is also applied to null packets where null packets that belonged to a specific stream are all remapped together to a defined value per program. The edge device can then select one of the original versions of the program (a version is also referred to as a media stream)—according to its PIDs—and strip off all the other PIDs. It then needs to remap the remaining PIDs (including the null packets) and it would have one legal CBR stream. From this point, if the edge device wants to treat the stream as a VBR stream it carries on as described above.

Conveniently, this multiplexing allows an alignment of transition points of different versions of the same program. That is, points that allow for graceful switching between one version and another can be adjacent within the stream. This would allow the edge device to select different versions of the same program dynamically and the transition would still be graceful.

It is noted that some amount of external metadata may be needed for the edge device to be able to perform its work in the best way. This metadata can indicate the assignment of different packet identifier values to null packets of different constant bit rate versions of the program. This metadata can assign an edge device that transmits a constant bit rate version of a program to ignore null packets of other versions of the program while transmit null packets that belong to that constant bit rate version of the program.

FIG. 1 illustrates system 100, server 200, and edge device 300 according to an embodiment of the invention.

System 100 can be a source of programs, can receive programs and can also generate some programs while receiving other programs. It can be located in a headend, in one or more hubs, and the like.

System 100 includes: (i) memory unit 110 that is adapted to store multiple variable bit rate version of a program; wherein different variable bit rate versions of the program differ from each other by their bit rate; (ii) converter 120 that is adapted to convert each variable bit version of the program to a constant bit version of the program by adding null packets so that once an edge device removes the null packets a valid single program transport stream is generated; and (iii) transmitter 130 that is adapted to transmit multiple constant bit versions of the program to a server that is coupled to an edge device.

Converter 120 conveniently converts a variable bit rate version of a program to a constant bit rate program that has a bit rate that will suffice for conveying the variable bit rate version and additional null packets. The bit rate of that constant bit rate version can equal the maximal bit rate of the variable bit rate version of the program.

According to an embodiment of the invention converter 120 includes multiplexer 122 that multiplexes multiple constant bit rate versions of the program.

Conveniently, converter 120 is adapted to multiplex the multiple constant bit rate versions of the program so that transition points of different constant bit rate versions of the program are proximate to each other. Transition points can be defined between slices, between access units and the like.

According to an embodiment of the invention converter 120 is adapted to assign different packet identifier values to null packets of different constant bit rate versions of the program and generate metadata that reflects the assignment. This metadata can be sent to server 200 and then to edge device via out of band channels or via in band channels. This metadata can be included within the program or not.

Conveniently, the conversion of a variable bit rate version of a program to a constant bit rate version of a program involves adding null packets.

The bit rate of the constant bit rate version of the program is reflected by the relationship between (i) the number of transport stream packets (including null packets) between the transport stream packets that include two consecutive program time references multiplied by the number of bits per packet and (ii) the timing difference between these two consecutive program time references.

The conversion to a constant bit rate program involves increasing the bit rate in order to bridge the gap between the bit rate of a section of the variable bit rate to a constant bit rate. In certain cases this gap can be bridged by just adding one or more null packets between transport stream packets that include two consecutive program. In some cases the gap is not completely bridged by this addition. This can require to re-stamp one or more program clock reference or to allow a small gap (usually smaller than a gap introduced by a single null packet) to exist.

Accordingly, converter 120 can alter at least one program clock reference value when an addition of one or more null packets does not compensate for timing gaps between a variable bit version of the program to a corresponding constant bit version of the program. Additionally or alternatively, converter 120 can allow a small gap to exist.

Figure 2:
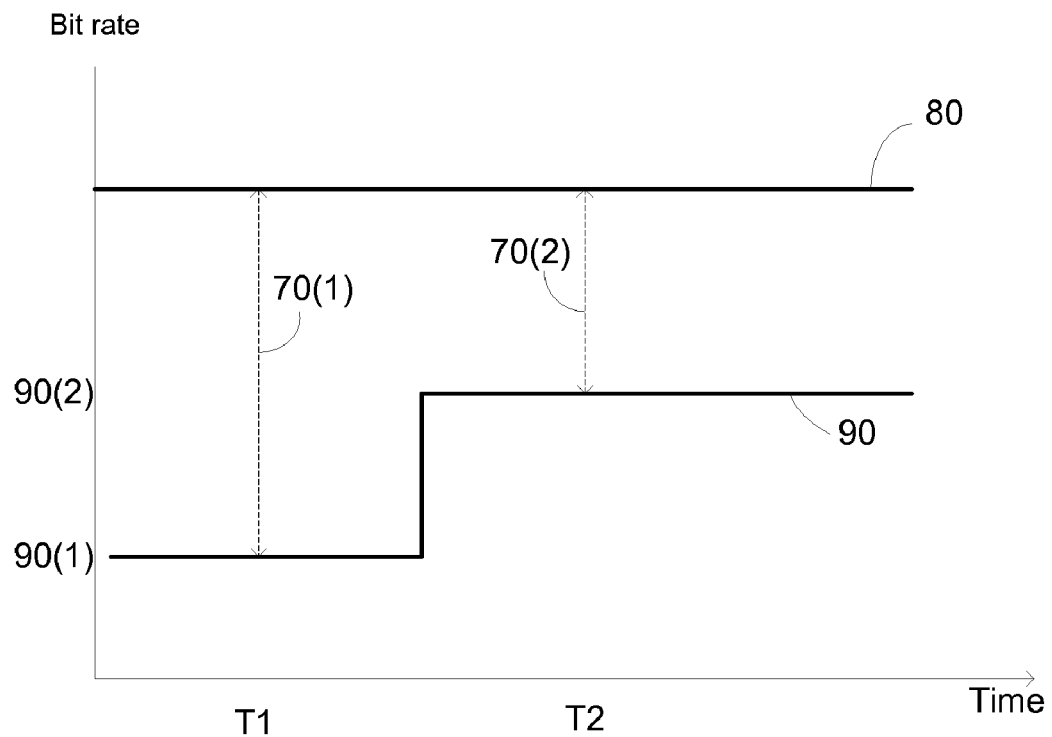
FIG. 2 is a timing diagram that illustrates the differences between constant bit rate and variable bit rate and how the timing gaps can be bridges according to various embodiments of the invention.

FIG. 2 is a timing diagram that illustrates the differences between constant bit rate and variable bit rate and how the timing gaps can be bridged according to various embodiments of the invention.

Horizontal curve 80 represents the constant bit rate of a portion of a CBR version of a program. Curve 90 illustrates a portion of a VBR version of the program.

At a certain point in time (T1) there is a gap 70(1) between the constant bit rate C1 and a temporal bit rate 90(1) of the VBR version of the program. At yet another point in time (T2) there is another gap 70(2) between the constant bit rate C1 and another temporal bit rate 90(2) of the VBR version of the program.

Gap 70(1) can be bridged by adding few (K) null packets, each of 188 bytes. In this case there is no need to perform PCR re-stamping.

Gap 70(2) cannot be adequately bridged by just adding null packets. This can occur if, for example, the gap is not a multiple of 188 bytes. Thus a fraction of a packet is required (optionally—in addition to many "full" null packets) to bridge the gap. In this case PCR stamping may be required.

System 100 is connected over network 150 to server 200. Server 200 can include memory unit 210 and streamer unit 230 that is adapted to stream programs to edge device 300 over network 250.

Edge device 300 usually transmits programs to one or more end user units. It can include radio frequency modulators or other modulators and is typically connected to multiple end user devices over a hybrid fiber coax network.

Edge device 300 includes: (i) memory unit 310 that is adapted to store portions (and especially tiny portions) of multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated; (ii) selection unit 320 that is adapted to select, at each point in time out of multiple points in time, a selected constant bit rate portion of a constant bit rate version of the program while ignoring constant bit rate portions of other constant bit rate versions of the program; and (iii) transmitter 330 that is adapted to transmit a portion of a version of the program in response to the selection.

It is noted that the selection can be responsive to bit rate constraints, to quality of service constraints and the like. Selecting between versions of the same program can be applied in various prior art methods and requires no additional explanation.

Conveniently, edge device 300 receives and memory unit 310 stores metadata that reflects an assignment of different packet identifier values to null packets of different constant bit rate versions of the program. This metadata can assist edge device 300 to differentiate between null packets of a selected portion of a version of a program and null packets of other versions. This differentiation can be useful in various occasions and especially when edge device 300 eventually transmits a constant bit rate version of a program.

Conveniently, transmitter 330 is adapted to re-map packet identifiers of different selected portions of the same program to the same packet identifier value. This can assist the end user device to apply the same PID filtering despite the switching between different versions of the same program.

Selection unit 320 is adapted to switch from one portion of a version of the program to another. The switching utilizes the proximity between transition points of different constant bit rate versions of the program in a multiplex of multiple constant bit versions of the program received by the edge device. The proximity assists the edge device in that it does not need to search large volumes of information before finding the transition point of the next selected portion of the version of the program.

It is noted that system 100 can transmit constant bit rate representations of a program to servers that cannot manage the transmission of variable bit rate programs, and that these constant bit rate programs can be sent to edge devices that can support variable bit rate programs and those who can only support constant bit rate programs.

Dashed arrows represent multiple CBR versions of the program (collectively denoted 50), metadata 40 that are sent from system 100 to server 200 and from server 200 to edge device 300. The VBR or CBR) versions of a program that are transmitted by edge devices 300 is denoted 60.

Figure 3:
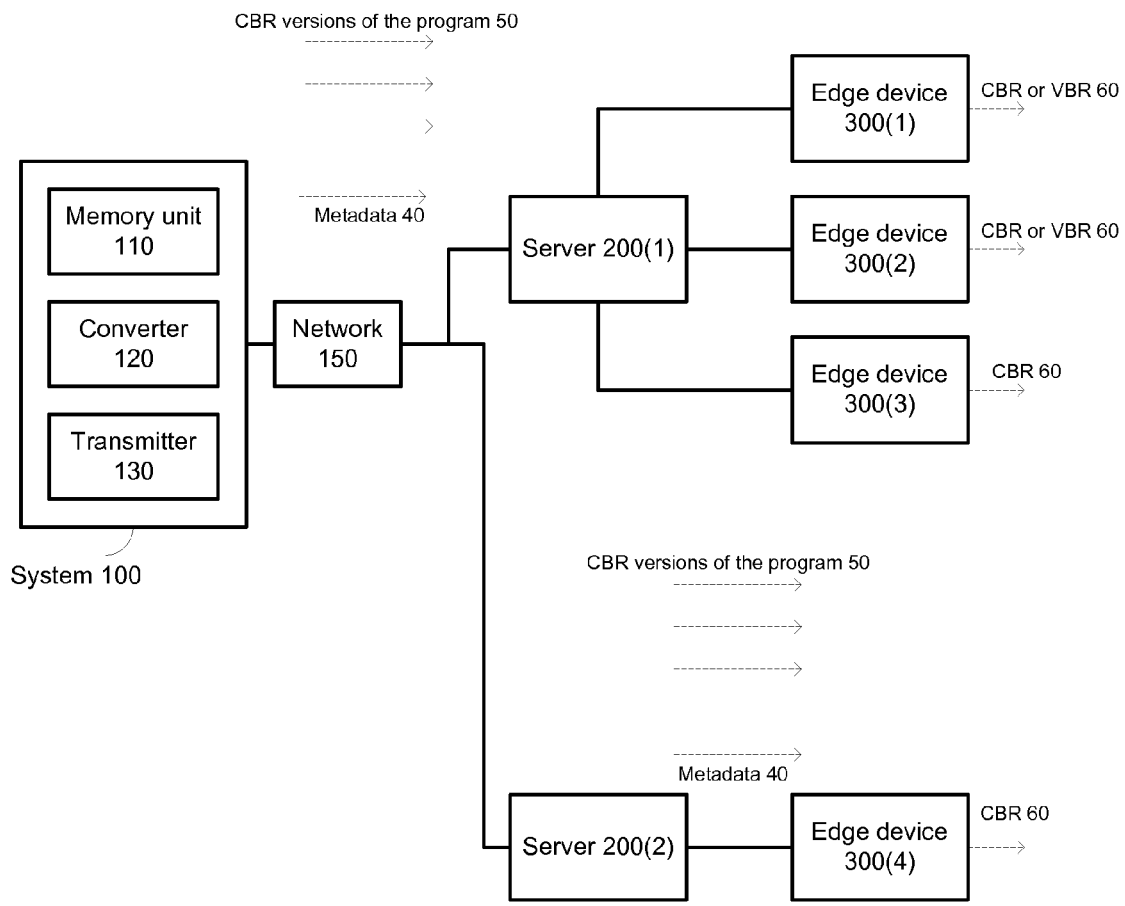
FIG. 3 illustrates a system, servers and edge devices according to an embodiment of the invention.

FIG. 3 illustrates system 100, servers 200(1) and 200(2), and edge devices 300(1), 300(2), 300(3) and 300(4) according to an embodiment of the invention.

System 100 is connected via network 150 to servers 200(1) and 200(2). Server 200(1) is connected to edge devices 300 (1), 300(2) and 300(3) while server 200(2) is connected to edge device 300(4).

It is assumed that edge devices 300(1) and 300(2) can manage variable bit rate programs while edge devices 300(3) and 300(4) can manage only constant bit rate programs. It is also assumed that server 200(1) can support variable bit rate programs while server 200(2) supports only constant bit rate programs.

Despite these differences system 100 sends the same constant bit rate versions of the program to each server (out of servers 200(1) and 200(2)) and these servers conveniently send these constant bit rate versions of the program to each of the edge devices. Edge devices 300(1) and 300(2) will remove null packets and transmit variable bit rate programs while edge devices 300(3) and 300(4) will not perform such a removal and transmit constant bit rate programs.

Dashed arrows represent multiple CBR versions of the program (collectively denoted 50), metadata 40 that are sent from system 100 to servers 200(1) and 200(2) and from these servers to edge devices 300(1), 300(2), 300(3) and 300(4). The VBR or CBR (or just CBR) versions of a program that are transmitted by edge devices 300(1) and 300(2) as well as the CBR version of the program that is transmitted by edge devices 300(3) and 300(4) are denoted 60.

Figure 4:
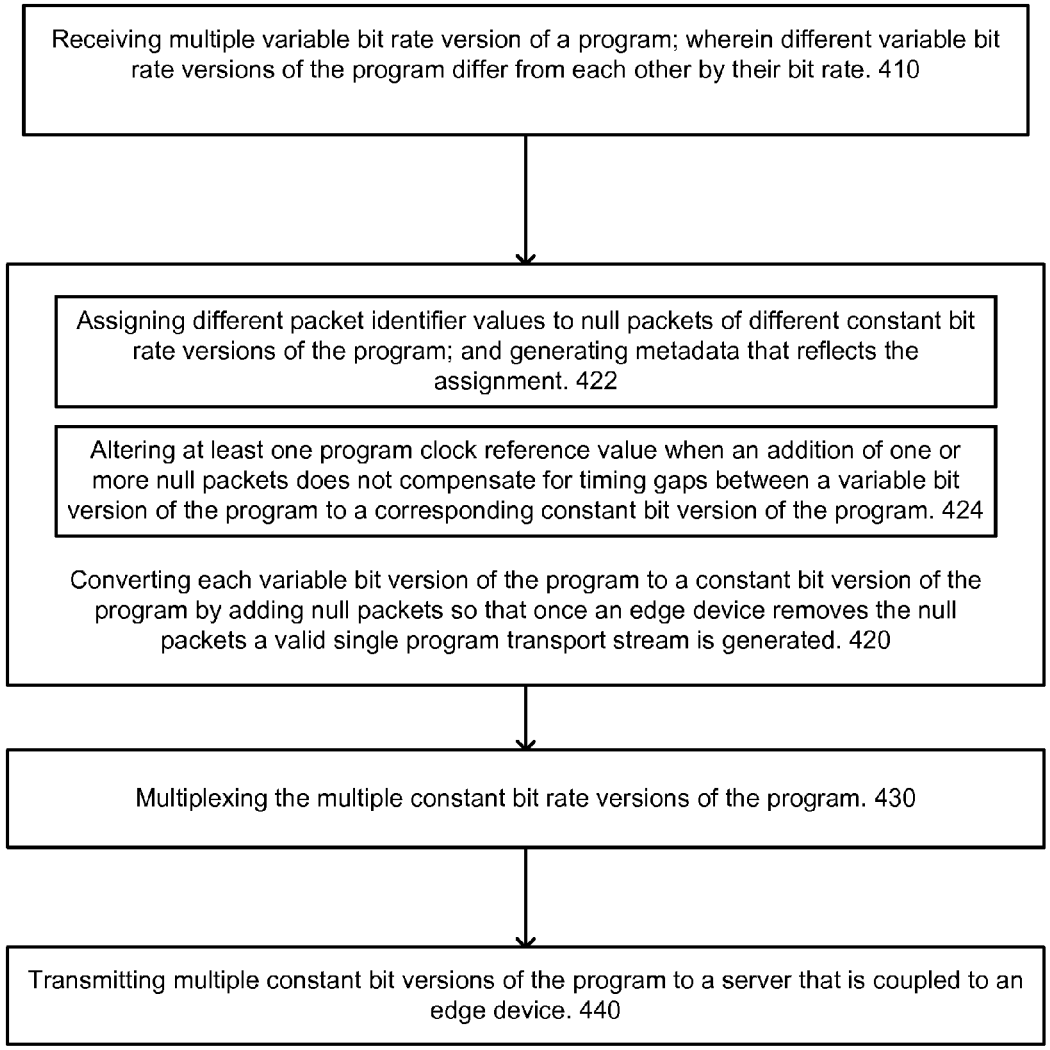
FIG. 4 illustrates a method for providing multiple versions of a program, according to an embodiment of the invention.

FIG. 4 illustrates method 400 for providing multiple versions of a program, according to an embodiment of the invention.

Method 400 starts by stage 410 of receiving multiple variable bit rate version of a program; wherein different variable bit rate versions of the program differ from each other by their bit rate.

Stage 410 is followed by stage 420 of converting each variable bit version of the program to a constant bit version of the program by adding null packets so that once an edge device removes the null packets a valid single program transport stream is generated.

Stage 420 is followed by stage 430 or 440. Stage 430 is followed by stage 440.

Stage 440 includes transmitting multiple constant bit versions of the program to a server. The server can be coupled to an edge device but this is not necessarily so.

Stage 430 includes multiplexing multiple constant bit rate versions of the program. Stage 430 can include multiplexing the multiple constant bit rate versions of the program so that transition points of different constant bit rate versions of the program are proximate to each other.

Stage 420 can include stage 422 of assigning different packet identifier values to null packets of different constant bit rate versions of the program; and generating metadata that reflects the assignment.

Additionally or alternatively, stage 420 can include stage 424 of altering at least one program clock reference value when an addition of one or more null packets does not compensate for timing gaps between a variable bit version of the program to a corresponding constant bit version of the program.

Figure 5:
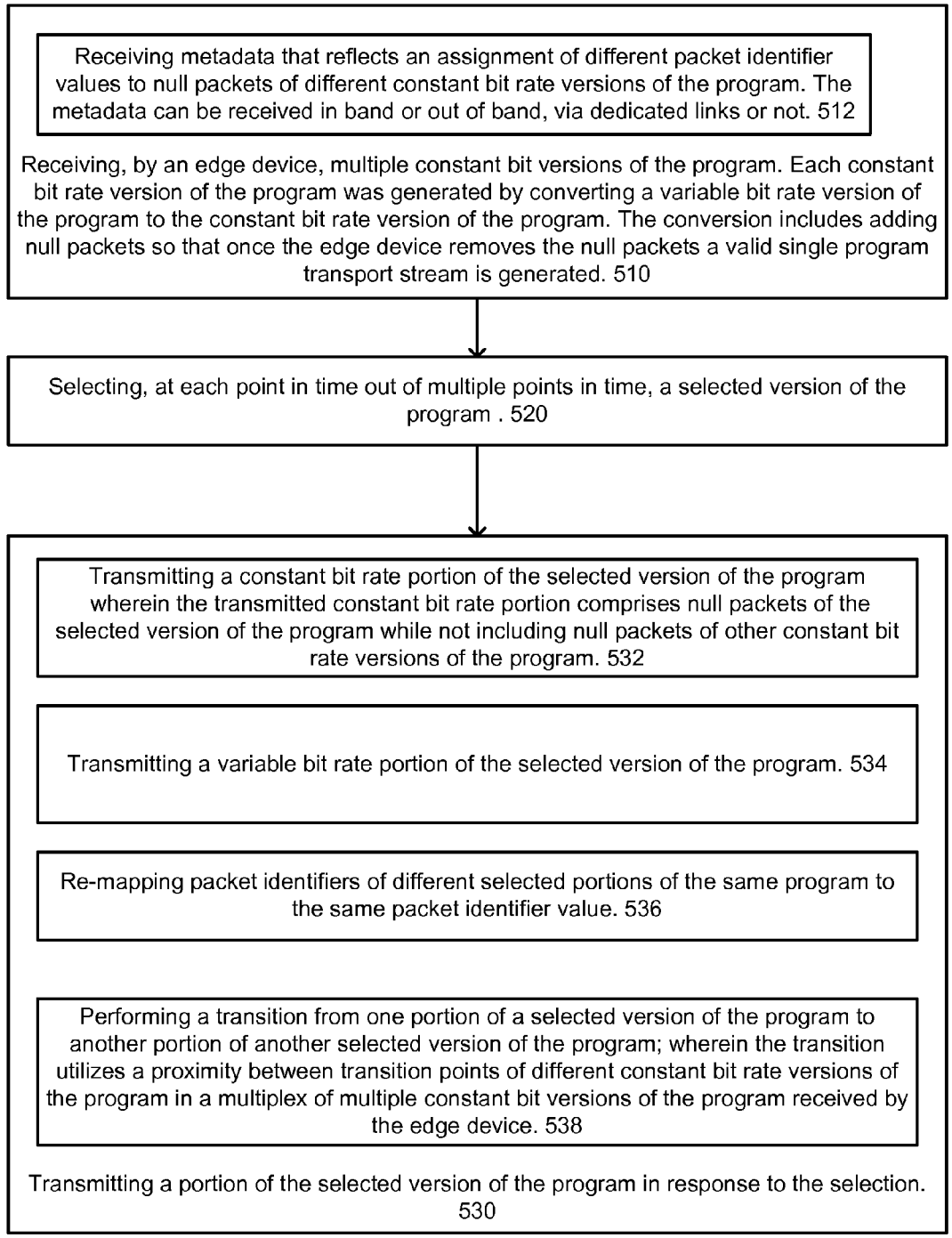
FIG. 5 illustrates a method for outputting a program, according to an embodiment of the invention.

FIG. 5 illustrates method 500 for outputting a program, according to an embodiment of the invention.

Method 500 starts by stage 510 of receiving, by an edge device, multiple constant bit versions of the program. Each constant bit rate version of the program was generated by converting a variable bit rate version of the program to the constant bit rate version of the program. The conversion includes adding null packets so that once the edge device removes the null packets a valid single program transport stream is generated.

Stage 510 is followed by stage 520 of selecting, at each point in time out of multiple points in time, a selected version of the program.

Stage 520 is followed by stage 530 of transmitting a portion of the selected version of the program in response to the selection.

Stage 510 can include stage 512 of receiving metadata that reflects an assignment of different packet identifier values to null packets of different constant bit rate versions of the program. The metadata can be received in band or out of band, via dedicated links or not.

Stage 530 can include at least one of the following stages or a combination thereof: (i) stage 532 of transmitting a constant bit rate portion of the selected version; wherein the transmitted constant bit rate portion comprises null packets of the selected constant bit rate portion while not including null packets of other constant bit rate versions of the program; (ii) stage 534 of transmitting a variable bit rate portion of the selected version; (iii) stage 536 of re-mapping packet identifiers of different selected portions of the same program to the same packet identifier value; (iv) stage 538 of performing a transition from one portion of a version of the program to another; wherein the transition utilizes a proximity between transition points of different constant bit rate versions of the program in a multiplex of multiple constant bit versions of the program received by the edge device.

It is noted that stage 536 and 538 can be performed before the transmission and can be preformed by an entity that differs from a transmitter.

Each of the mentioned above methods can be executed by a computer that is provided with one or more computer readable programs. These one or more computer readable programs can be included in one or more computer usable mediums of one or more computer program products.

For example, a computer usable medium can be provided. It includes a computer readable program, wherein the computer readable program when executed on a computer causes the computer to: receive multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated; select, at each point in time out of multiple points in time, a selected constant bit rate portion of a constant bit rate version of the program while ignoring constant bit rate portions of other constant bit rate versions of the program; and transmit a portion of a version of the program in response to the selection.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, FIG. 1 illustrates controller as being included in configurable receiver but this is not necessarily so. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Also, devices functionally forming separate devices may be integrated in a single physical device.

However, other modifications, variations and alternatives are also possible. The specifications and drawings are, accordingly, to be regarded in an illustrative rather than in a restrictive sense.

The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

We claim:

1. A method for providing multiple versions of a program, the method comprises:
    receiving multiple variable bit rate versions of a program; wherein different variable bit rate versions of the program differ from each other by their bit rate;
    converting each variable bit rate version of the program to a constant bit rate version of the program, wherein the converting comprises: adding null packets so that once an edge device removes the null packets a valid single program transport stream is generated and altering at least one program clock reference value when an addition of one or more null packets does not compensate for timing gaps between a variable bit rate version of the program to a corresponding constant bit rate version of the program;
    transmitting multiple constant bit rate versions of the program to a server that is coupled to an edge device; and
    transiting, by the edge device, from one portion of a selected version of the program to another portion of another selected version of the program; wherein the transiting utilizes a proximity between transition points of different constant bit rate versions of the program in a multiplex of multiple constant bit versions of the program received by the edge device.

2. The method according to claim 1 comprising multiplexing multiple constant bit rate versions of the program.

3. The method according to claim 1 comprising multiplexing the multiple constant bit rate versions of the program so that transition points of different constant bit rate versions of the program are proximate to each other.

4. The method according to claim 1 comprising assigning different packet identifier values to null packets of different constant bit rate versions of the program; and generating metadata that reflects the assignment.

5. A computer program product comprising a non-transitory computer usable storage medium including a computer readable program, wherein the computer readable program when executed on a computer causes the computer to:
    receive multiple variable bit rate version of a program; wherein different variable bit rate versions of the program differ from each other by their bit rate;
    convert each variable bit rate version of the program to a constant bit rate version of the program by adding null packets so that once an edge device removes the null packets a valid single program transport stream is generated and by altering at least one program clock reference value when an addition of one or more null packets does not compensate for timing gaps between a variable bit rate version of the program to a corresponding constant bit rate version of the program; and
    transmit multiple constant bit rate versions of the program to a server that is coupled to an edge device; and
    transiting, by the edge device, from one portion of a selected version of the program to another portion of another selected version of the program; wherein the transiting utilizes a proximity between transition points of different constant bit rate versions of the program in a multiplex of multiple constant bit versions of the program received by the edge device.

6. The computer program product according to claim 5, wherein the computer readable program when executed on a computer causes the computer to multiplex multiple constant bit rate versions of the program.

7. The computer program product according to claim 5, wherein the computer readable program when executed on a computer causes the computer to multiplex the multiple constant bit rate versions of the program so that transition points of different constant bit rate versions of the program are proximate to each other.

8. The computer program product according to claim 5, wherein the computer readable program when executed on a computer causes the computer to assign different packet identifier values to null packets of different constant bit rate versions of the program; and generating metadata that reflects the assignment.

9. A method for outputting a program, the method comprises:
    receiving, by an edge device, multiple constant bit versions of the program; wherein each constant bit rate version of the program was generated by converting a variable bit rate version of the program to the constant bit rate version of the program; wherein the conversion includes adding null packets so that once the edge device removes the null packets a valid single program transport stream is generated and altering at least one program clock reference value when an addition of one or more null packets does not compensate for timing gaps between a variable bit rate version of the program to a corresponding constant bit rate version of the program;

selecting, at each point in time out of multiple points in time, a selected version of the program;

transiting from one portion of a selected version of the program to another portion of another selected version of the program; wherein the transiting utilizes a proximity between transition points of different constant bit rate versions of the program in a multiplex of multiple constant bit versions of the program received by the edge device; and transmitting a portion of the selected version of the program in response to the selection.

10. The method according to claim 9 further comprising receiving metadata that reflects an assignment of different packet identifier values to null packets of different constant bit rate versions of the program.

11. The method according to claim 10 comprising transmitting a constant bit rate portion of the selected version; wherein the transmitted constant bit rate portion comprises null packets of the selected constant bit rate portion while not including null packets of other constant bit rate versions of the program.

12. The method according to claim 10 comprising transmitting a variable bit rate portion of the selected version of the program while ignoring null packets included in the selected constant bit rate portion.

13. The method according to claim 9 comprising re-mapping packet identifiers of different selected portions of the same program to the same packet identifier value.

14. A computer program product comprising a non-transitory computer usable storage medium including a computer readable program, wherein the computer readable program when executed on a computer of an edge device causes the computer to:

receive multiple constant bit rate versions of the program; wherein each constant bit rate version of the program was generated by converting a variable bit rate version of the program to the constant bit rate version of the program; wherein the conversion includes adding null packets so that once the edge device removes the null packets a valid single program transport stream is generated and altering at least one program clock reference value when an addition of one or more null packets does not compensate for timing gaps between a variable bit rate version of the program to a corresponding constant bit rate version of the program;

select, at each point in time out of multiple points in time, a selected constant bit rate portion of a constant bit rate version of the program while ignoring constant bit rate portions of other constant bit rate versions of the program;

switch, in response to the selection, from one portion of a version of the program to the selected constant bit rate portion; wherein the switching utilizes a proximity between transition points of different constant bit rate versions of the program in a multiplex of multiple constant bit versions of the program received by the edge device; and transmit the selected constant bit rate portion of a version of the program in response to the selection.

15. The computer program product according to claim 14, wherein the computer readable program when executed on a computer causes the computer to receive metadata that reflects an assignment of different packet identifier values to null packets of different constant bit rate versions of the program.

16. The computer program product according to claim 15, wherein the computer readable program when executed on a computer causes the computer to transmit the selected constant bit rate portion; wherein the transmitted constant bit rate portion comprises null packets of the selected constant bit rate portion while not including null packets of other constant bit rate versions of the program.

17. The computer program product according to claim 15, wherein the computer readable program when executed on a computer causes the computer to transmit a variable bit rate portion associated with the selected constant bit rate portion while ignoring null packets included in the selected constant bit rate portion.

18. The computer program product according to claim 14, wherein the computer readable program when executed on a computer causes the computer to re-map packet identifiers of different selected portions of the same program to the same packet identifier value.

19. A system comprising:

a memory unit adapted to store multiple variable bit rate version of a program; wherein different variable bit rate versions of the program differ from each other by their bit rate;

a converter, adapted to convert each variable bit version of the program to a constant bit version of the program by adding null packets so that once an edge device removes the null packets a valid single program transport stream is generated and by altering at least one program clock reference value when an addition of one or more null packets does not compensate for timing gaps between a variable bit rate version of the program to a corresponding constant bit rate version of the program; and a transmitter adapted to transmit multiple constant bit rate versions of the program to a server that is coupled to an edge device; and transiting, by the edge device, from one portion of a selected version of the program to another portion of another selected version of the program; wherein the transiting utilizes a proximity between transition points of different constant bit rate versions of the program in a multiplex of multiple constant bit versions of the program received by the edge device.

20. The system according to claim 19, wherein converter is adapted to multiplex multiple constant bit rate versions of the program.

21. The system according to claim 19 wherein the converter is adapted to multiplex the multiple constant bit rate versions of the program so that transition points of different constant bit rate versions of the program are proximate to each other.

22. The system according to claim 19 wherein the converter is adapted to assign different packet identifier values to null packets of different constant bit rate versions of the program; and generating metadata that reflects the assignment.

23. An edge device comprising:

a memory unit adapted to store portions of multiple constant bit rate versions of the program; wherein each constant bit rate version of the program was generated by converting a variable bit rate version of the program to the constant bit rate version of the program; wherein the conversion includes adding null packets so that once the edge device removes the null packets a valid single program transport stream is generated and altering at least one program clock reference value when an addition of one or more null packets does not compensate for timing gaps between a variable bit rate version of the program to a corresponding constant bit rate version of the program;

a selection unit adapted to select, at each point in time out of multiple points in time, a selected constant bit rate portion of a constant bit rate version of the program while ignoring constant bit rate portions of other constant bit rate versions of the program and to switch from one portion of a version of the program to another; wherein the switching utilizes a proximity between transition points of different constant bit rate versions of the program in a multiplex of multiple constant bit versions of the program received by the edge device; and a transmitter adapted to transmit a portion of a version of the program in response to the selection.

24. The edge device according to claim 23, wherein the memory unit is adapted to store metadata that reflects an assignment of different packet identifier values to null packets of different constant bit rate versions of the program.

25. The edge device according to claim 24, wherein the transmitter is adapted to transmit the selected constant bit rate portion; wherein the transmitted constant bit rate portion comprises null packets of the selected constant bit rate portion while not including null packets of other constant bit rate versions of the program.

26. The edge device according to claim 24, wherein the transmitter is adapted to transmit a variable bit rate portion associated with the selected constant bit rate portion while ignoring null packets included in the selected constant bit rate portion.

27. The edge device according to claim 23, wherein the converter is adapted to re-map packet identifiers of different selected portions of the same program to the same packet identifier value.

* * * * *